United States Patent
Curley et al.

(10) Patent No.: US 8,267,818 B2
(45) Date of Patent: Sep. 18, 2012

(54) SNAP TOGETHER SPLIT SPROCKET

(75) Inventors: Patrick L. Curley, Vancouver, WA (US); William R. Fulton, Maple Ridge (CA)

(73) Assignee: Epic Polymer Systems Corp., Langley (CA)

( * ) Notice: Subject to any disclaimer, the term of this patent is extended or adjusted under 35 U.S.C. 154(b) by 564 days.

(21) Appl. No.: 12/431,645

(22) Filed: Apr. 28, 2009

(65) Prior Publication Data

US 2010/0273592 A1    Oct. 28, 2010

(51) Int. Cl.
*F16H 55/12* (2006.01)
(52) U.S. Cl. .......................... 474/96; 474/152
(58) Field of Classification Search ............... 474/95, 474/96, 152, 153, 902
See application file for complete search history.

(56) References Cited

U.S. PATENT DOCUMENTS

| | | | | |
|---|---|---|---|---|
| 360,645 | A * | 4/1887 | Haute | 474/96 |
| 403,116 | A * | 5/1889 | Lawson et al. | 474/96 |
| 405,352 | A * | 6/1889 | Gilbert | 474/95 |
| 406,287 | A * | 7/1889 | Kehler | 474/96 |
| 462,363 | A * | 11/1891 | Murray | 474/96 |
| 536,696 | A * | 4/1895 | Hirsh | 74/448 |
| 969,148 | A * | 8/1910 | Downs | 74/460 |
| 2,382,740 | A * | 8/1945 | Noffsinger | 474/96 |
| 3,083,585 | A * | 4/1963 | Dawe et al. | 474/96 |
| 4,506,559 | A * | 3/1985 | Francke et al. | 74/439 |
| 5,702,316 | A * | 12/1997 | Cole | 474/96 |
| 5,833,562 | A * | 11/1998 | Walker, Sr. | 474/96 |
| 6,074,316 | A * | 6/2000 | Murrietta, Sr. | 474/96 |
| 6,146,299 | A | 11/2000 | Harvey | 474/95 |
| 2007/0161443 | A1* | 7/2007 | Krisl | 474/95 |

OTHER PUBLICATIONS

Advertising Bulletin No. 84-1180-1, Polymeric Split N78 Sprocket Application Report #101, May 1984, Rexnord Inc., 1 page.
Brochure, REDCO Mill Chain Sprockets, Redwood Plastics Corporation, mid-1990s, 6 pages.
Brochure, REDCO™ Polyurethane Sprockets, Redwoods Plastics Corporation, mid-1990s, 2 pages.
Advertising Bulletin No. 85-1170, Brochure, Sprocket design and chain life, 1985, 4 pages.
Brochure, Link-Belt® Power Transmission Products, FMC Corp., 1977, 5 pages.

(Continued)

*Primary Examiner* — Thomas B Will
*Assistant Examiner* — Joan D Misa
(74) *Attorney, Agent, or Firm* — Seed IP Law Group PLLC (57) ABSTRACT

Described herein is a sprocket for interfacing with a perforated material, such as a chain. The sprocket includes a hub and a material-interfacing plate. The hub is shaped to fit around an axially extending shaft, and includes a plurality of hub portions each shaped to fit around a portion of the shaft; and a retaining portion and a hub interlocking portion, each disposed on at least one of the hub portions. The material-interfacing plate has a periphery that is shaped to interface with the perforated material, and includes a plurality of plate portions each shaped to fit around a portion of the hub; and a plate interlocking portion shaped to interlock with the hub interlocking portion and disposed on at least one of the plate portions. The material-interfacing plate is in a secured position when the plate interlocking portion and the hub interlocking portion are interlocked with each other. The interlocked plate and hub interlocking portions prevent the material-interfacing plate from sliding radially off the hub and the retaining portion prevents the material-interfacing plate from sliding axially off the hub when the material-interfacing plate is in the secured position.

20 Claims, 8 Drawing Sheets

OTHER PUBLICATIONS

Brochure, Manganese Steel Alloy or Carbon Steel Sprockets for C&H Class Chain, Rexnard Inc., 1968, 3 pages.
Brochure, Mill Chain Sprockets, Can-Am Products, Jan. 2005, 7 pages.
Brochure, New Zinc Aluminum Alloy (ZA12) Mill Chain Sprockets, Anson Sales Ltd., Jan. 6, 1985, 5 pages.
Brochure, Innovator Sprockets The Ultimate Sprocket System, I'Anco, May 1, 2006, 4 pages.
Brochure, Rex Engineered Chain Sprockets, Rexnord Inc., 1984, 2 pages.
Brochure, H&C Class Chain Sprockets & Idlers, Cam Chain Co., Ltd., 1989, 2 pages.
Website, Sprockets, Hern Iron Works, http://www.hernironworks.com/sprockets.html, Apr. 21, 2003, 2 pages.
Website, Anson Mill Chain Sprocket, Anson Industrial Manufacturing Corporation, http://www.ansonindustrial.com/sprocket.html, May 27, 2003, 1 page.
Website, Products Information Mill Chain Sprockets, Linn Gear Co., http://www.linngear.com/products/highlights/infosheets/mc-1.html, Apr. 11, 2001, 1 page.
Website, Power Transmission and Conveying Equipment, Rexnord Inc., http://pt.rexnord.com, Feb. 12, 2008, 2 pages.
Website, Power Transmission and Conveying Equipment, Rexnord Inc., http://pt.rexnord.com, Jan. 13, 2007, 2 pages.
Website, VC Sprockets Design Available, Viking Chains, Inc., http://vikingchains.com/page136.htm, Dec. 4, 2004, 1 page.
Brochure, Manganese Steel Alloy or Carbon Steel Sprockets for C&H Class Chain, Rexnard Inc., 1968, 1 page.

* cited by examiner

SNAP TOGETHER SPLIT SPROCKET

FIELD OF THE INVENTION

The present invention relates to a split sprocket that can be assembled without relying on fasteners or welding to hold the various components of the sprocket together.

BACKGROUND OF THE INVENTION

Sprockets are products that are shaped to rotate on a shaft and to interface with an indented or a perforated material such as a chain or track. A common type of sprocket known in the art is a "split sprocket", which is a type of sprocket that typically includes four components, a two-part hub and a two-part material-interfacing plate, all of which are held together with nuts and bolts. The fact that the sprocket is split allows it to be clamped on to the shaft at any point along the shaft, as opposed to having to receive the shaft at one end thereof and then slid along the shaft to a desired position. Typically, eight nuts and bolts are used to hold together this type of split sprocket. Consequently, assembling or disassembling this type of split sprocket can be quite cumbersome. It can take roughly fifteen minutes for a person to assemble or disassemble this type of split sprocket, and if several of these sprockets need to be assembled or disassembled at any one time, the amount of time required can result in substantial decreases in productivity and substantial increases in costs.

Split sprockets can also be held together using welding. However, welding is a time consuming process and requires hiring a relatively expensive welder. During welding, certain safety procedures also need to be followed. Consequently, just as when fasteners are used in split sprocket assembly, welding can also result in substantial decreases in productivity and substantial increases in costs.

Accordingly, there exists a need for a split sprocket that improves on at least one of the deficiencies of split sprockets known in the art.

SUMMARY OF THE INVENTION

According to a first aspect of the invention, there is provided a sprocket for interfacing with a perforated material. The sprocket has a hub that is shaped to fit around an axially extending shaft. The hub is made of a plurality of hub portions each shaped to fit around a portion of the shaft. The hub also has a retaining portion and a hub interlocking portion, each disposed on at least one of the hub portions. The sprocket also has a material-interfacing plate that has a periphery shaped to interface with the perforated material. The material-interfacing plate is made of a plurality of plate portions each shaped to fit around a portion of the hub. The material-interfacing plate also has a plate interlocking portion shaped to interlock with the hub interlocking portion and disposed on at least one of the plate portions. The material-interfacing plate is in a secured position when the plate interlocking portion and the hub interlocking portion are interlocked with each other. The interlocked plate and hub interlocking portions prevent the material-interfacing plate from sliding radially off the hub and the retaining portion prevents the material-interfacing plate from sliding axially off the hub when the material-interfacing plate is in the secured position.

At least one of the plate portions can be sufficiently elastic such that the plate interlocking portion can flex and snugly fit around a portion of the hub and interlock with the hub interlocking portion when the material-interfacing plate is in the secured position.

The retaining portion may be composed of a pair of retaining walls extending radially from the hub and be shaped to retain a portion of the material-interfacing plate therebetween.

At least one of the plate portions may have a slot therein, the at least one of the plate portions being sufficiently elastic such that it can flex about the slot to facilitate interlocking of the hub interlocking portion and the plate interlocking portion.

A first hub portion and a second hub portion may each have a hub interlocking portion. A first plate portion may have both a first plate interlocking portion and a second plate interlocking portion. When the hub interlocking portion of the first hub portion interlocks with the first plate interlocking portion and the hub interlocking portion of the second hub portion interlocks with the second plate interlocking portion, the material-interfacing plate is in the secured position. The hub interlocking portion of the first hub portion and the hub interlocking portion of the second hub portion may each include a notch, and the first and second plate interlocking portions may each include a lip. The lip of the first plate portion can fit into the notch of the first hub portion and the lip of the second plate portion can fit into the notch of the second hub portion when the material-interfacing plate is in the secured position.

Each of the plate interlocking portions can include a shaved corner shaped to facilitate sliding the plate interlocking portions and the hub interlocking portions together into the secured position.

The hub can be made of two hub portions and the material-interfacing plate can be made of two plate portions. The two hub portions can be identical to each other, and the two plate portions can be identical to each other. The two hub portions can contact each other along a hub split plane and the two plate portions can contact each other along a plate split plane, the hub split plane and the plate split plane being orthogonal to each other. The hub split plane may also intersect the slot in the plate portion or the axis of the shaft.

The periphery of the material-interfacing plate can have teeth for interfacing with the material, or it can be toothless.

One benefit of the invention is that the time required to install and remove the sprocket from the shaft is significantly reduced relative to conventional split sprockets that rely on either fasteners or welding for assembly. This results in less downtime for any machinery that relies on the sprockets of the present invention relative to conventional split sprockets, and also means that fewer man-hours are required to install and remove the sprockets of the present invention, further decreasing costs.

Another benefit of the invention is that in addition to saving a sprocket user time and money during sprocket installation and removal, the sprocket of the present invention is also easier and cheaper and faster to manufacture that conventional split sprockets. For example, a manufacturer does not need to pay for expensive metal fasteners or drill holes to prepare the sprocket to receive fasteners. The sprocket of the present invention can consequently typically be manufactured for 20%-30% less than conventional split sprockets.

BRIEF DESCRIPTION OF THE DRAWINGS

FIGS. 7(a)-(f) each show exemplary dimensions of the sprocket according to the first embodiment and of the various components thereof.

DETAILED DESCRIPTION OF AN EXEMPLARY EMBODIMENT

Sprockets are manufactured in various shapes and sizes and for a variety of purposes. Sprockets include drive sprockets, which are disposed on a driven shaft for transferring energy to a perforated material such as a chain or track; idler sprockets, which do not impart additional energy to the perforated material but are used for purposes such as maintaining tension in the perforated material; and toothless sprockets, which are sprockets that do not use teeth to interface with the perforated material. The conventional "split sprocket" is a type of sprocket that typically includes four components, a two-part hub and a two-part plate that interfaces with the perforated material ("material-interfacing plate"), all of which is held together with nuts and bolts. Advantageously, the split sprocket can be clamped to a shaft at any point along the shaft; disadvantageously, the conventional split sprocket is typically held together using fasteners or welding. Consequently, assembly and disassembly of conventional split sprockets is time consuming, labour intensive, and costly.

The embodiments described herein are a type of split sprocket that advantageously can be clamped to the shaft at any point along the shaft, but that do not rely on fasteners or welding for assembly and disassembly. Consequently, the embodiments described herein can be relatively quickly and easily assembled and disassembled relative to conventional split sprockets, and can therefore be more easily and inexpensively manufactured, installed, and replaced than conventional split sprockets.

Figure 1:
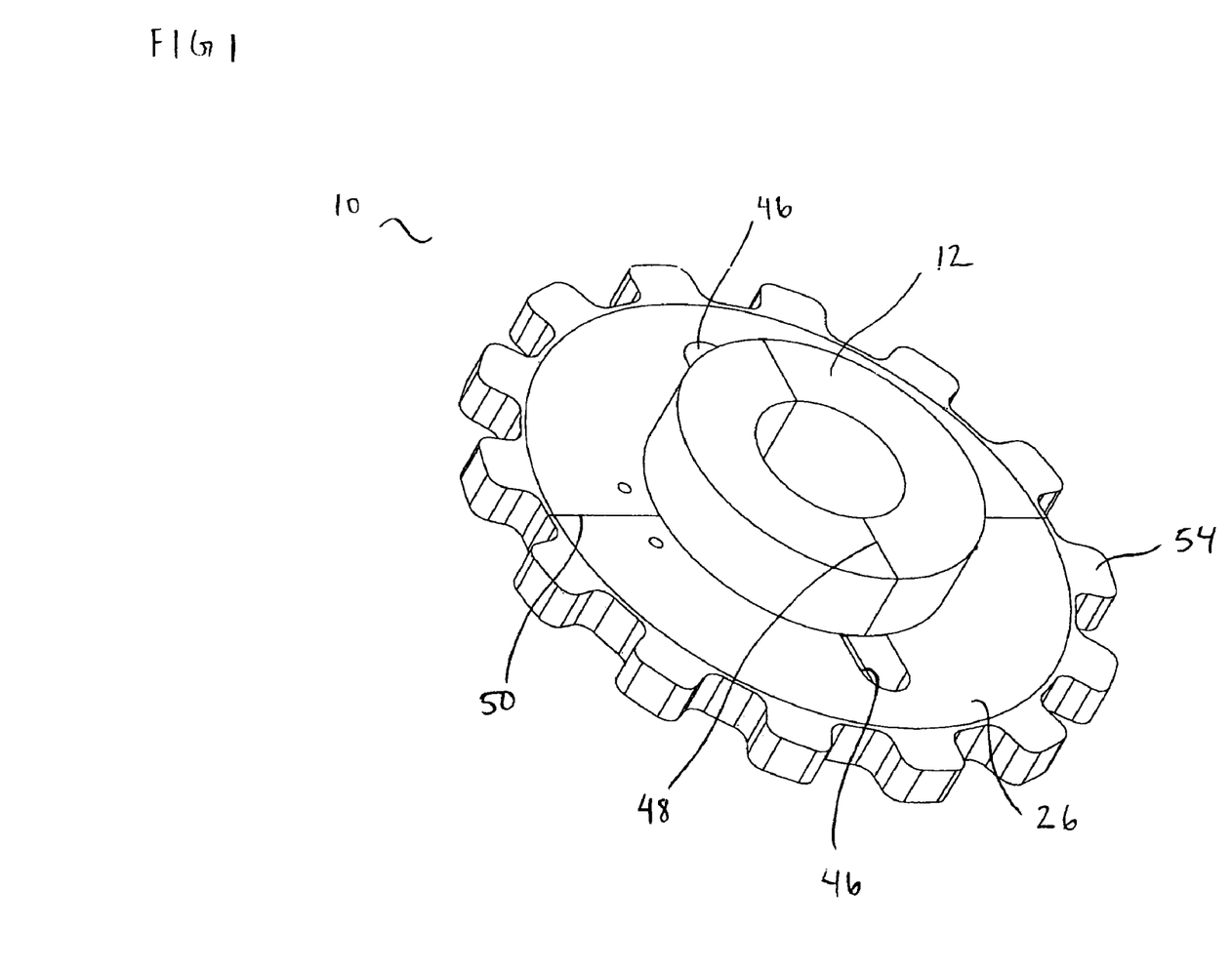
FIG. 1 is a perspective view of a sprocket according to a first embodiment.
Figure 2:
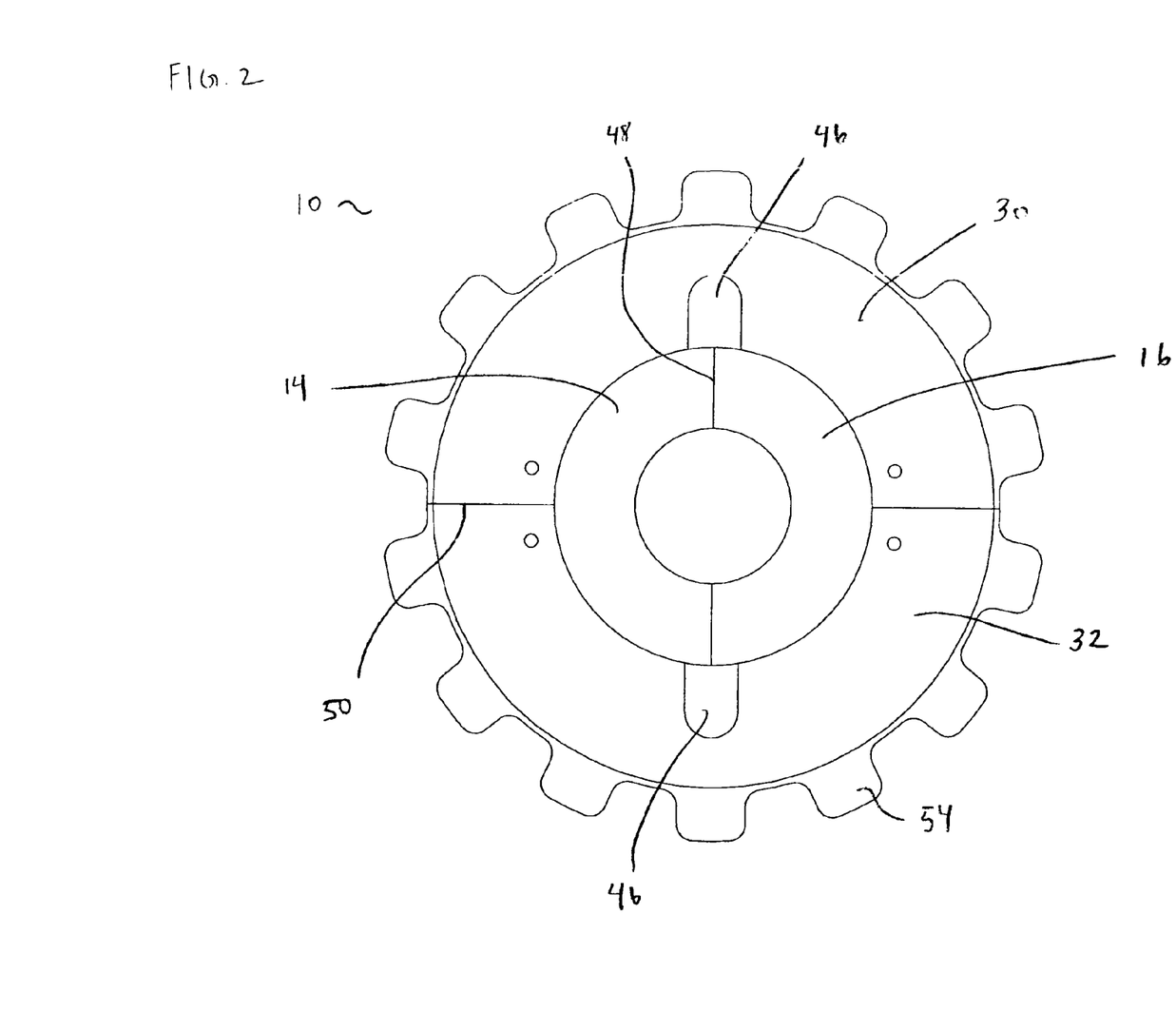
FIG. 2 is a front elevation view of a sprocket according to the first embodiment.
Figure 3:
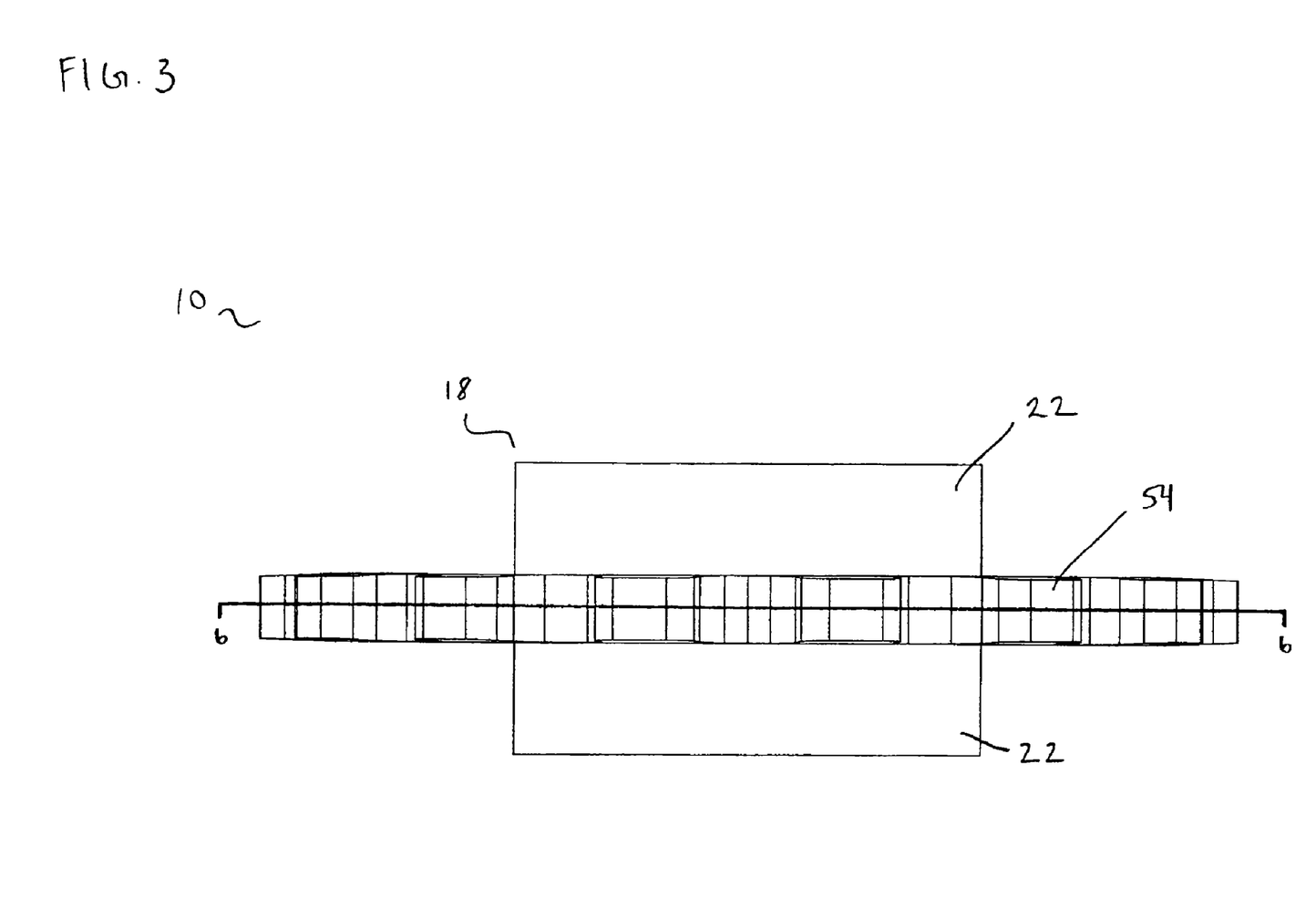
FIG. 3 is a left side elevation view of a sprocket according to the first embodiment.

Referring now to FIGS. 1-3, there is depicted a sprocket 10 for interfacing, or meshing, with a perforated material such as a chain (not shown). The sprocket 10 meshes with the perforated material using teeth 54 extending along the periphery of the sprocket 10. The sprocket 10 is composed of a hub 12 and a material-interfacing plate 26. The hub 12 is clamped around the shaft (not shown) by the material-interfacing plate 26. Hub and plate interlocking portions, discussed in more detail in relation to FIGS. 4 to 7, below, secure the hub 12 and the plate 26 together in a secured position. The shaft on to which the sprocket 10 is clamped extends axially lengthwise along its axis of rotation; the shaft also has a radial axis, which is orthogonal to its axis of rotation. Although the sprocket 10 is depicted as being shaped to receive a cylindrical shaft, the shaft may have a cross-section that is any suitable shape, such as square or triangular.

The sprocket 10 is composed of four separate and interlockable components, namely a first hub portion 14 and a second hub portion 16 forming the hub 12, and a first plate portion 30 and a second plate portion 32 forming the plate 26. The hub portions 14, 16 meet along a hub split plane 48. In the depicted embodiments, the first and second hub portions 14, 16 are identical and the first and second plate portions 30, 32 are identical. The plate portions 30, 32 meet along a plate split plane 50. In the depicted embodiment, the hub split plane 48 and the plate split plane 50 are orthogonal to each other and both intersect the axis of rotation of the shaft.

Figure 4:
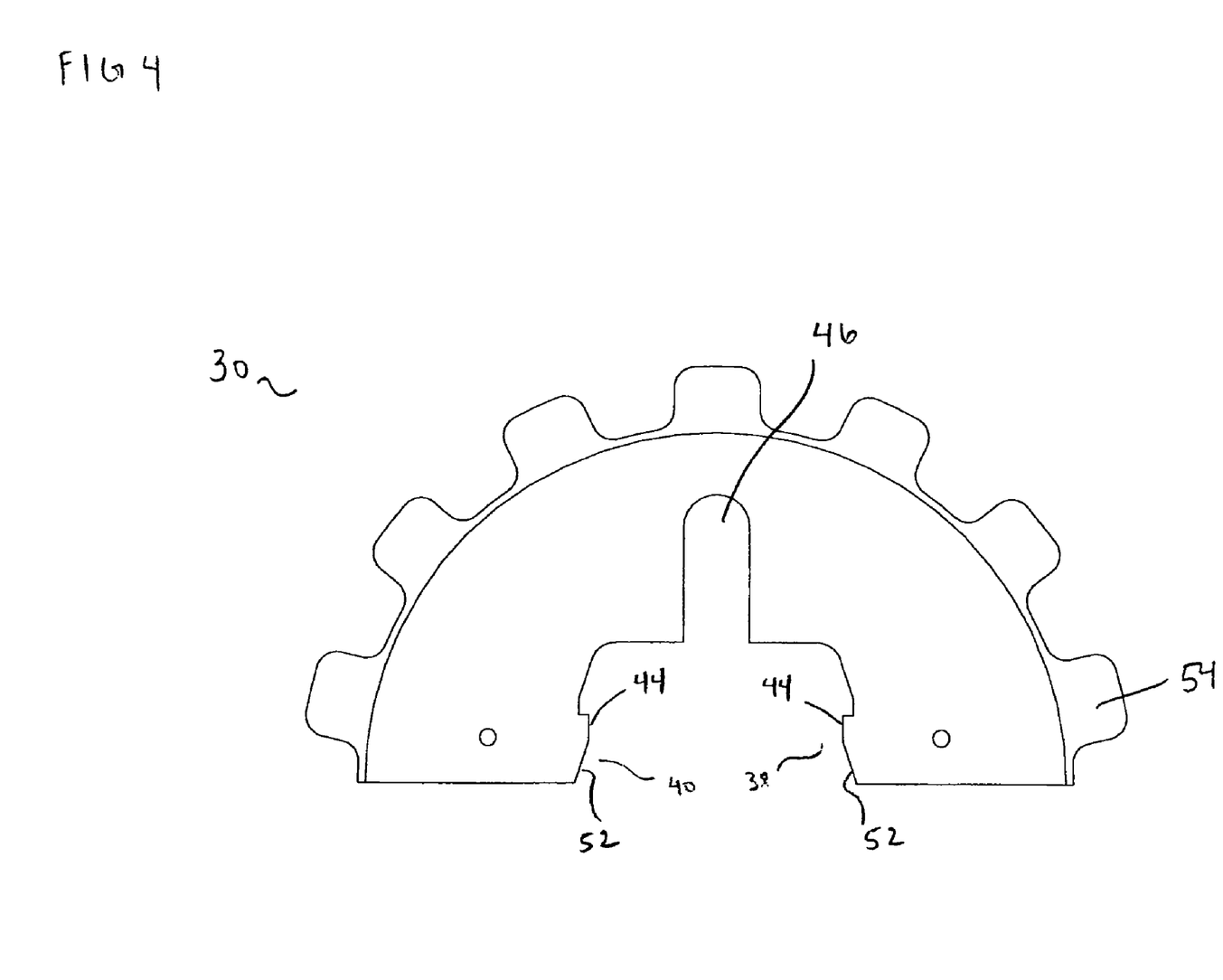
FIG. 4 is a front elevation view of a plate portion according to the first embodiment.

Referring now to FIG. 4, there is depicted a front elevation view of the first plate portion 30. The first plate portion 30 has a generally semi-circular profile with a cavity extending inwards from the flat edge of the semi-circular end into which the first and second hub portions 14, 16 can be inserted, as discussed in more detail in respect of FIG. 6, below. In particular, the first plate portion 30 has a first plate interlocking portion 38 and a second plate interlocking portion 40. Each of the plate interlocking portions 38, 40 is composed of a lip 44 that is shaped to fit into, or engage, a corresponding notch 42 (see FIGS. 5 and 6) in one of the hub portions 14, 16 and a shaved corner 52 that facilitates initial insertion of the hub portions 14, 16 into the first plate portion 30. As mentioned above, when in the secured position, the plate 26 can clamp the hub 12 into position around the shaft. The first plate portion 30 is composed of, for example, an elastic material such as a polyurethane elastomer that has a "memory". By "memory", it is meant that a material is elastically deformable such that it can be temporarily deformed, or flexed, from an initial position to a deformed position through application of a force, and when the force is removed the material returns to the initial position. The inherent elasticity, or memory, of the first plate portion 30 is used to provide the clamping force. An exemplary polyurethane elastomer that can be used is the Redco™ 750 Polyurethane, produced by Redwood Plastics Corporation. In this regard, a slot 46 is disposed in the first plate portion 30. The length of the slot 46 is selected to reduce the amount of material between the cavity and the semi-circular edge of the first plate portion 30 to an amount that provides sufficient flexibility for the first plate portion 30 to bend and receive the hub portions 14, 16, yet maintain sufficient mechanical strength to meet operational requirements. In particular, the hub 12 should be able to be inserted into and removed from the first plate portion 30, yet the first plate portion 30 should retain sufficient elasticity to clamp down on the hub 12. Beneficially, the size of the slot 46 can be varied directly with the size of the first plate portion 30 such that a sprocket user can consistently apply roughly the same amount of force to insert or remove the hub portions 14, 16 from the first plate portion 30 regardless of the size of the first plate portion 30.

Figure 5:
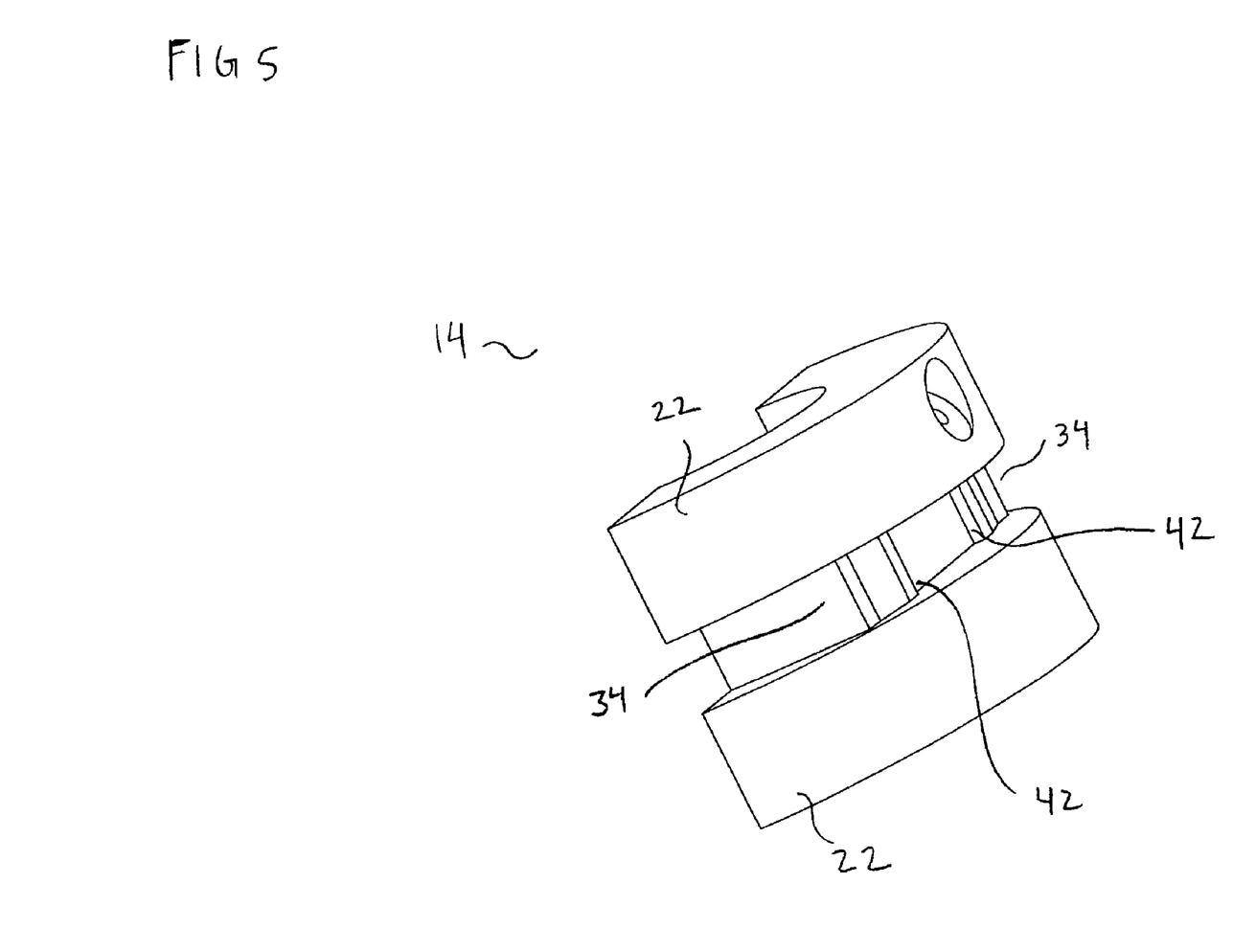
FIG. 5 is a perspective view of a hub portion according to the first embodiment.

Referring now to FIG. 5, there is depicted a perspective view of the first hub portion 14. The first hub portion 14 includes two hub interlocking portions 34; when the plate 26 is in the secured position, the first and second hub portions 14 are pushed together and one of the hub interlocking portions 34 of the first hub portion 14 is inserted into the first plate portion 30 and the other of the hub interlocking portions 34 of the first hub portion 14 is inserted into the second plate portion 32. The notch 42 in each of the hub interlocking portions 34 is shaped to receive the lip 44 of the plate interlocking portions 38, 40 when the plate 26 is in the secured position, thereby helping to secure the plate 26 to the hub 12 by preventing the plate 26 from radially sliding off the hub 12.

Referring now to FIGS. 3 and 5, the first hub portion 14 also has a retaining portion that is composed of two radially extending retaining walls 22 joined together and axially spaced by the hub interlocking portions 34. When the plate 26 is in the secured position and engaged with the hub interlocking portions 34, a portion of the plate 26 is contained between the retaining walls 22, thereby preventing the plate 26 from sliding axially off the hub 12. In the depicted embodiments, the retaining walls 22 of each of the hub portions 14, 16 are semi-cylindrical and the retaining walls 22 of one of the hub portions 14 contact the retaining walls 22 of the other of the hub portions 16 at the hub split plane 48. Consequently, in order for the retaining walls 22 to prevent axial sliding of the plate 26 in the depicted embodiments, the hub split plane 48 and the plate split plane 50 are not coplanar. In the depicted embodiments, the hub split plane 48 and the plate split plane 50 are orthogonal. In the depicted embodiments, the slots 46 are disposed midway along each of the plate portions 30, 32; consequently, the hub split plane 48 also intersects the slots 46. Both the hub split plane 48 and the plate split plane 50 also intersect the axis of rotation of the shaft; this allows the first and second hub portions 14, 16 to be identical to each other and the first and second plate portions 30, 32 to be identical to each other, thereby making manufacturing of the sprocket 10 easier, and consequently lowering manufacturing costs.

Although the sprocket 10 is depicted as having semi-cylindrical retaining walls 22, alternative designs are possible. For example, the first hub portion 14 may have cylindrical retaining walls, while the second hub portion 16 may have no retaining walls at all.

Figure 6:
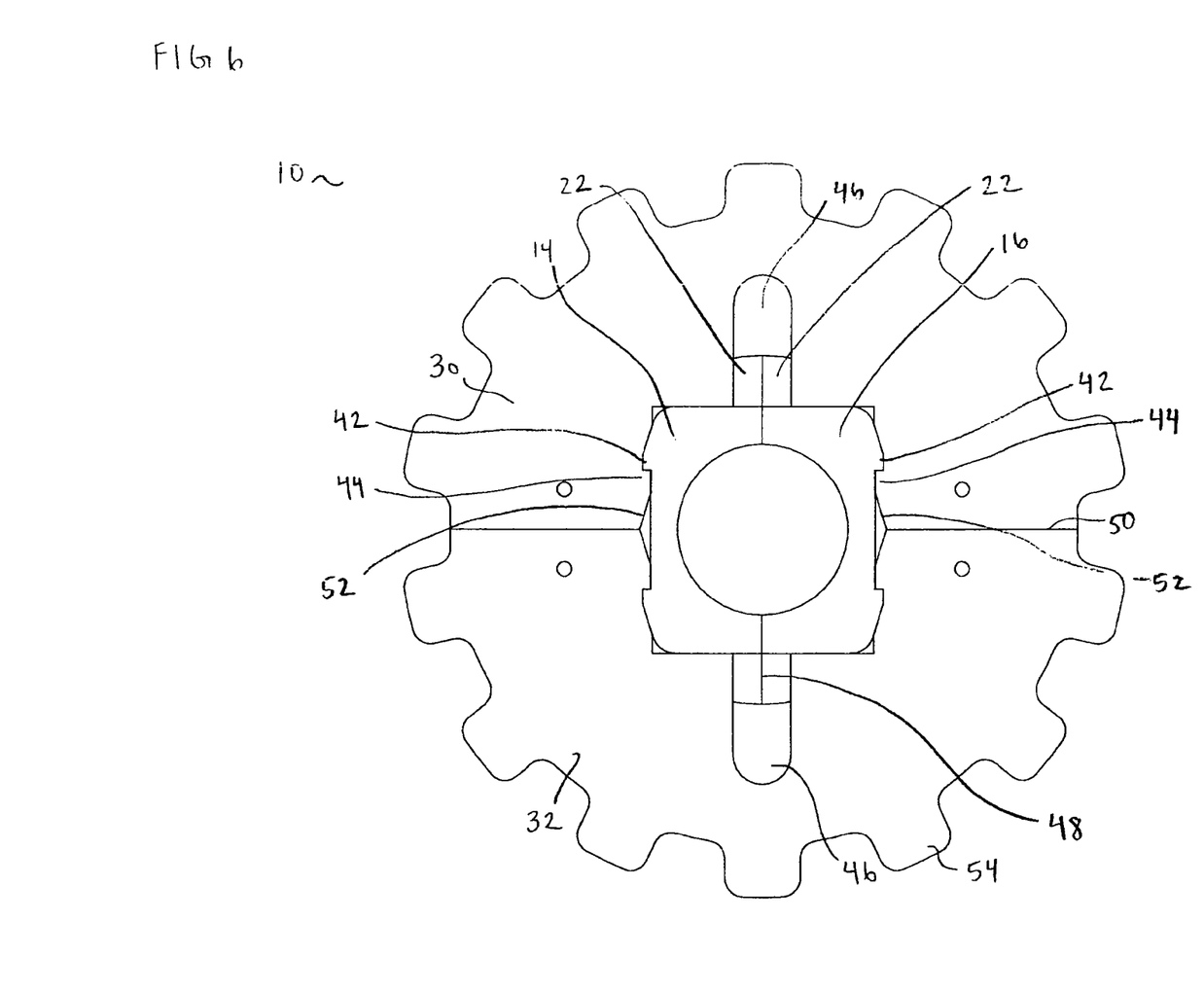
FIG. 6 is a sectional view of a sprocket according to the first embodiment, taken along line 6-6 in FIG. 3.
Figures 7A, 7F:
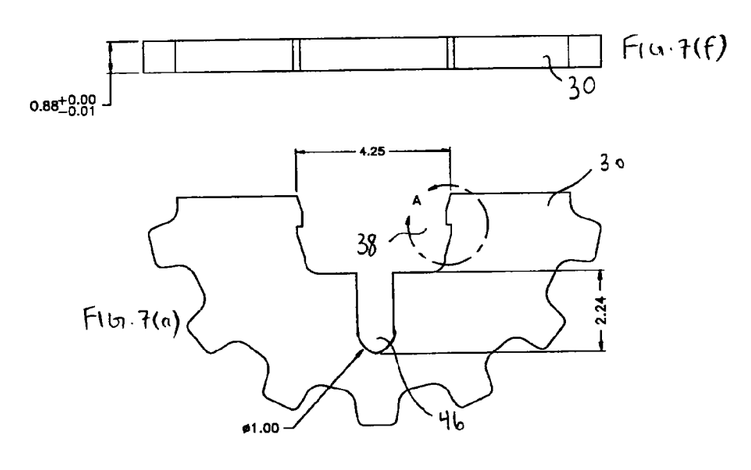
FIG. 7(a) is a front elevation view of the plate portion according to the first embodiment.
FIG. 7(f) is a top plan view of the plate portion depicted in FIG. 7(a).
Figures 7B, 7E:
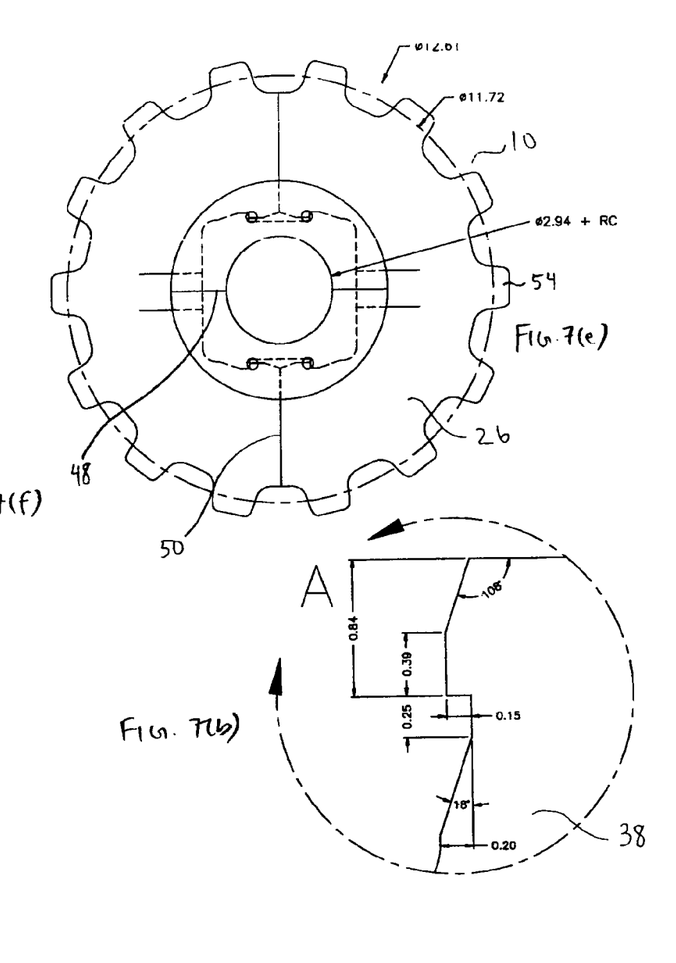
FIG. 7(b) is a detailed view of area A of the plate portion depicted in FIG. 7(a)
FIG. 7(e) is a front elevation view of the sprocket according to the first embodiment.
Figure 7C:
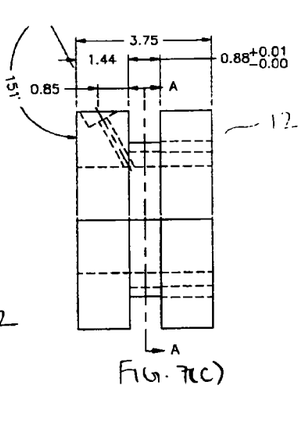
FIG. 7(c) is a side elevation view of a hub of the sprocket according to the first embodiment.
Figure 7D:
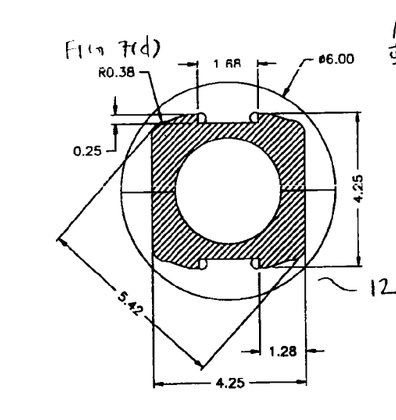
FIG. 7(d) is a sectional view of the hub taken along line A-A of FIG. 7(c)

Referring now to FIG. 6, the manner in which the sprocket 10 can be assembled will be discussed. The user can first place the first and second hub portions 14, 16 on to a desired position on the shaft, thereby surrounding a portion of the shaft with the hub 12. The first and second hub portions 14, 16 touch each other as depicted in FIG. 6. Then, while holding the hub 12 with one hand, the user can push the first plate portion 30 on to the hub 12 such that the first plate interlocking portion 38 of the first plate portion 30 interlocks with the hub interlocking portion 34 of the first hub portion 14 and the second plate interlocking portion 40 of the first plate portion 30 interlocks with the hub interlocking portion 34 of the second hub portion 16. In FIG. 6, the notches 42 on the first and second hub portions 14, 16 are interlocked with the lips 44 on the first plate portion 30. The shaved corners 52 on the first plate portion 30 will facilitate the initial insertion of the hub 12 into the first plate portion 30. Following this, the partially assembled sprocket 10 should be stable enough to remain on the shaft without assistance from the user. The user can then take the second plate portion 32 and push it on to the exposed first and second hub portions 14, 16 in an similar fashion. Following this, the plate 26 is in the secured position and the sprocket 10 is ready for use.

To remove the sprocket 10 from the shaft, a wedge or lever can be inserted into the plate split plane 50 and the first and second plate portions 30, 32 can be leveraged apart. This should be sufficient to remove at least one of the plate portions 30, 32. If the other of the plate portions 30, 32 remains, the user can manually remove it by, for example, grabbing either end of the plate portion 30 or 32 and pulling it off the hub 12 while flexing the plate portion 30 or 32 about the slot 46.

Referring now to FIG. 7, there are depicted various views that illustrate exemplary dimensions of the sprocket 10 and the various components thereof, such as the hub 12, first plate portion 30, and first interlocking portion 38, as designed to accommodate a 14-tooth sprocket. Unless otherwise indicated, distance measurements are in inches. Persons skilled in the art will recognize that different dimensions can be utilized for sprockets having, for example, different numbers of teeth or adapted to fit shafts of different diameters.

Exemplary materials that can be used to manufacture the sprocket 10 include polyurethane; UMHW/polyethylene; nylon; and any other suitable materials such as metal (e.g.: aluminum). The physical and mechanical properties of a typical polyurethane (Redco™ 750 Polyurethane, as mentioned above) that can be used in manufacturing the sprocket 10 are provided in Table 1, below:

TABLE 1

Typical Physical and Mechanical Properties of Redco ™ 750 Polyurethane that Can Be Used in Sprocket Manufacturing

| | |
|---|---|
| Hardness, Durometer Value ASTM D676-59T | 75D |
| Specific Gravity | 1.2 |
| Tensile Strength, PSI ASTM D412-61T | 6382 |
| Elongation at Break, % ASTM D412-61T | 208 |
| 100% Modulus, PSI ASTM D412-61T | 5348 |
| Tear Strength Split, PLI ASTM D470 | 157 |
| Bayshore Rebound % | 45 |
| Impact Resistance Izod Notched, FT LB/IN @ 75° F. (ASTM D746-57T) | 17 |
| Bell Brittle Point Temp ° F. | −70 |
| Compression Set % Method B (ASTM S395) | 43 |

The sprocket 10 can also be manufactured from a mix of materials; for example, plastic could be used to manufacture the hub 12 and metal could be used to manufacture the plate 26. When the sprocket 10 is manufactured using plastic, it can be manufactured through molding.

Figure 8:
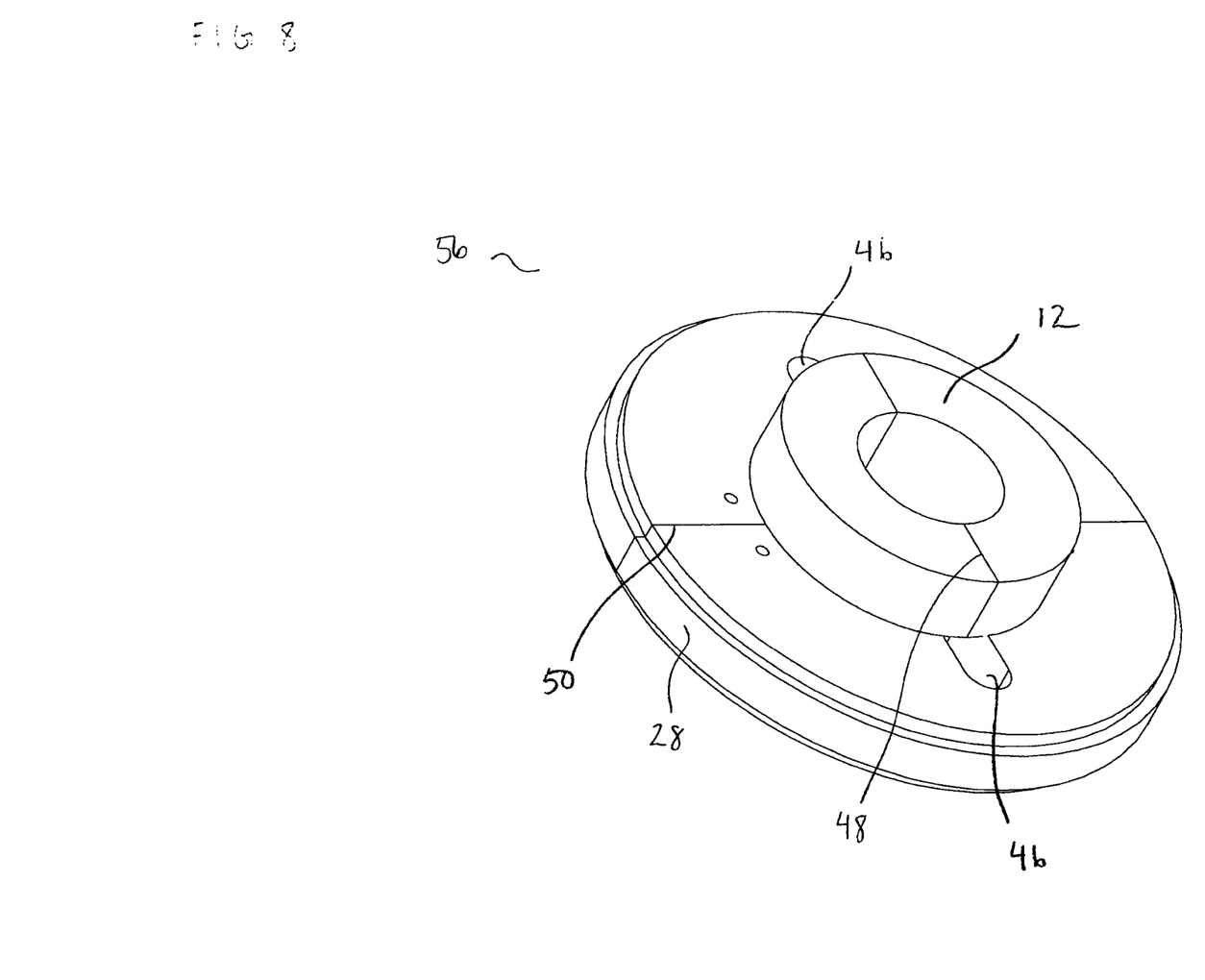
FIG. 8 is a perspective view of a toothless sprocket according to a second embodiment.

Referring now to FIG. 8, there is depicted a perspective view of a toothless sprocket 56. The toothless sprocket 56 has a smooth periphery 28 for interfacing with the perforated material such as a chain, but otherwise is identical to the sprocket 10.

While illustrative embodiments of the invention have been described, it will be appreciated that various changes can be made therein without departing from the scope and spirit of the invention. The invention is therefore to be considered limited solely by the scope of the appended claims.

What is claimed is:

1. A sprocket for interfacing with a perforated material, comprising:
 (a) a hub shaped to fit around an axially extending shaft, the hub comprising:
  (i) a plurality of hub portions each shaped to fit around a portion of the shaft; and
  (ii) a retaining portion and a hub interlocking portion, each disposed on at least one of the hub portions; and
 (b) a material-interfacing plate having a periphery shaped to interface with the perforated material, the material-interfacing plate comprising:
  (i) a plurality of plate portions each shaped to fit around a portion of the hub; and
  (ii) a plate interlocking portion shaped to interlock with the hub interlocking portion and disposed on at least one of the plate portions, the material-interfacing plate being in a secured position when the plate interlocking portion and the hub interlocking portion are interlocked with each other,
 the interlocked plate interlocking portion and hub interlocking portion preventing the material-interfacing plate from sliding radially off the hub and the retaining portion preventing the material-interfacing plate from sliding axially off the hub when the material-interfacing plate is in the secured position, wherein the at least one of the plate portions is sufficiently elastic that the at least one of the plate portions can flex from an initial position to a deformed position to allow the plate interlocking portion to fit around the hub interlocking portion, and wherein the material-interfacing plate transitions to the secured position when the at least one of the plate portions relaxes from the deformed position when around the hub interlocking portion such that the plate interlocking portion interlocks with the hub interlocking portion.

2. A sprocket as claimed in claim 1 wherein the retaining portion comprises a pair of retaining walls extending radially from the hub and shaped to retain a portion of the material-interfacing plate therebetween.

3. A sprocket as claimed in claim 1 wherein the at least one of the plate portions has a slot therein, the at least one of the plate portions being sufficiently elastic such that the at least one of the plate portions can flex about the slot to facilitate interlocking of the hub interlocking portion and the plate interlocking portion.

4. A sprocket as claimed in claim 1 wherein:
   (a) a first of the plurality of hub portions and a second of the plurality of hub portions each comprises a hub interlocking portion; and
   (b) a first of the plurality of plate portions comprises a first plate interlocking portion and a second plate interlocking portion;
   the hub interlocking portion of the first hub portion interlocking with the first plate interlocking portion and the hub interlocking portion of the second hub portion interlocking with the second plate interlocking portion when the material-interfacing plate is in the secured position.

5. A sprocket as claimed in claim 4 wherein the hub interlocking portion of the first hub portion and the hub interlocking portion of the second hub portion each comprises a notch and the first and second plate interlocking portions each comprises a lip, the lip of the first plate portion fitting into the notch of the first hub interlocking portion and the lip of the second plate portion fitting into the notch of the second hub interlocking portion when the material-interfacing plate is in the secured position.

6. A sprocket as claimed in claim 5 wherein each of the plate interlocking portions further comprises a shaved corner shaped to facilitate sliding the plate interlocking portions and the hub interlocking portions together into the secured position.

7. A sprocket as claimed in claim 5 wherein the hub comprises two hub portions and the material-interfacing plate comprises two plate portions.

8. A sprocket as claimed in claim 7 wherein the two hub portions are identical to each other and the two plate portions are identical to each other.

9. A sprocket as claimed in claim 7 wherein the two hub portions contact each other along a hub split plane and the two plate portions contact each other along a plate split plane, the hub split plane and the plate split plane being orthogonal to each other.

10. A sprocket as claimed in claim 9 wherein the at least one of the plate portions has a slot therein, the at least one of the plate portions being sufficiently elastic such that the at least one of the plate portions can flex about the slot to facilitate interlocking of the hub interlocking portion and the plate interlocking portion, and wherein the hub split plane intersects the slot.

11. A sprocket as claimed in claim 9 wherein the hub split plane intersects the axis of the shaft.

12. A sprocket as claimed in claim 1 wherein the at least one of the plate portions is in the initial position when the material-interfacing plate is in the secured position.

13. A sprocket, comprising:
   (a) a hub comprising a plurality of hub portions shaped to collectively fit around a shaft, each of the hub portions comprising a hub interlocking portion;
   (b) a plate comprising a plurality of plate portions shaped to collectively fit around the hub, each of the plate portions comprising a cavity in which two plate interlocking portions are located and that is shaped to receive two of the hub interlocking portions, each of the plate interlocking portions being shaped to interlock with the hub interlocking portion of one of the hub portions,
   wherein each of the plate portions deforms from an initial position to a deformed position while the hub portions are being inserted into the cavity, and relaxes from the deformed position once the hub portions are fully inserted into the cavity such that each of the plate interlocking portions interlocks with one of the hub interlocking portions to prevent the plate from sliding radially off the hub.

14. A sprocket as claimed in claim 13 wherein each of the hub portions further comprises a retaining portion shaped and position to prevent the plate from sliding axially off the hub when each of the plate interlocking portions is interlocked with one of the hub interlocking portions.

15. A sprocket as claimed in claim 14 wherein the plate comprises two plate portions and the hub comprises two hub portions.

16. A sprocket as claimed in claim 15 wherein each of the plate portions is in the initial position when each of the plate interlocking portions is interlocked with one of the hub interlocking portions.

17. A sprocket as claimed in claim 16 wherein each of the plate interlocking portions comprises a lip and each of the hub interlocking portions comprises a notch, the lip shaped to fit in the notch.

18. A sprocket as claimed in claim 15 wherein each of the plate portions clamps on to the hub when each of the plate interlocking portions is interlocked with one of the hub interlocking portions.

19. A sprocket, comprising:
   (a) a hub comprising two hub portions shaped to collectively fit around a shaft, each of the hub portions having opposing ends each comprising a notch; and
   (b) a plate comprising two plate portions shaped to collectively fit around the hub, each of the plate portions comprising a cavity having opposing sides each comprising a lip shaped to interlock with one of the notches, the cavity sized such that when the notches on the hub portions are oriented to face the lips on the plate portions and the ends of the hub portions are inserted into the cavity, each of the plate portions flexes from an initial position to a deformed position while the hub portions are being inserted and relaxes back to the initial position such that the lips and notches interlock with each other once the hub portions are fully inserted.

20. A sprocket as claimed in claim 19 wherein each of the hub portions further comprises two axially spaced and radially extending retaining walls between which the plate portions are positioned when the lips and notches are interlocked with each other.

* * * * *